(12) United States Patent
Ochoa et al.

(10) Patent No.: US 12,208,665 B1
(45) Date of Patent: Jan. 28, 2025

(54) VEHICLE DOOR STRUCTURE

(71) Applicant: NISSAN NORTH AMERICA, INC., Franklin, TN (US)

(72) Inventors: Eduardo Ochoa, Farmington Hills, MI (US); Ronald B. Morrow, Jr., Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 18/361,462

(22) Filed: Jul. 28, 2023

(51) Int. Cl.
*B60J 5/04* (2006.01)

(52) U.S. Cl.
CPC .......... *B60J 5/0451* (2013.01); *B60J 5/0413* (2013.01); *B60J 5/0415* (2013.01)

(58) Field of Classification Search
CPC ...... B60J 5/0434; B60J 5/0451; B60J 5/0413; B60J 5/0415
See application file for complete search history.

(56) References Cited

U.S. PATENT DOCUMENTS

| | | | | |
|---|---|---|---|---|
| 11,260,731 B2 * | 3/2022 | Itou | ........................ | B60J 5/0418 |
| 11,466,481 B2 * | 10/2022 | Muta | ...................... | B60J 5/0413 |
| 11,833,892 B2 * | 12/2023 | Barz | ....................... | B60J 5/0468 |
| 2008/0246309 A1 * | 10/2008 | Abe | ......................... | B60J 5/0451 |
| | | | | 296/187.05 |
| 2015/0224858 A1 * | 8/2015 | Yoshimoto | .............. | E05B 79/06 |
| | | | | 292/336.3 |
| 2022/0242203 A1 * | 8/2022 | Cordes | ................... | B60J 5/0416 |
| 2023/0166586 A1 * | 6/2023 | Dey | ......................... | B60J 5/0468 |
| | | | | 49/374 |

\* cited by examiner

*Primary Examiner* — Daniel J Troy
*Assistant Examiner* — Susan M. Heschel
(74) *Attorney, Agent, or Firm* — Global IP Counselors, LLP

(57) ABSTRACT

A vehicle door structure includes an inner door panel and an impact pad. The inner door panel has an access opening that extends from an inboard surface to an outboard surface of the inner door panel. The access opening is defined by an upper edge, a lower edge, a forward edge and a rearward edge. The impact pad has a main portion and a block portion. The main portion has a lower attachment section and an upper attachment section that are both located along an inboard side of the upper and lower edges. The lower attachment section is attached to the lower edge and the upper attachment section is attached to the upper edge. A section of the block portion is located along the outboard side of the inner door panel. The impact pad is spaced apart from the forward edge of the access opening.

11 Claims, 14 Drawing Sheets

VEHICLE DOOR STRUCTURE

BACKGROUND

Technical Field

The present disclosure generally relates to vehicle door structure. More specifically, the present disclosure relates to a vehicle door structure includes various structure elements that define an impact receiving path that ensures that a door handle assembly of the door undergoes minimal deformation during an impact event where impact force is applied to the vehicle door structure proximate the door handle assembly.

Background Information

Vehicles are continuously being redesigned to redirect the flow of impact forces during an impact event to reduce undesired effects of such impact events.

SUMMARY

One object of the present disclosure is to provide a vehicle door structure with an impact directing structure that reduces deformation of a door handle assembly during an impact event where impact force is applied to an area of the door proximate the door handle assembly.

In view of the state of the known technology, one aspect of the present disclosure is to provide a vehicle door structure with an inner door panel and an impact pad. The inner door panel has an inboard surface and an outboard surface with an access opening that extends from the inboard surface to the outboard surface. The access opening is defined by an upper edge, a lower edge, a forward edge and a rearward edge. The impact pad has a main portion and a block portion. The main portion has a lower attachment section and an upper attachment section that are both located along an inboard side of the upper and lower edges that define the access opening. The lower attachment section is attached to the lower edge and the upper attachment section is attached to the upper edge. A section of the block portion is located along the outboard side of the inner door panel. The impact pad is spaced apart from the forward edge of the access opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
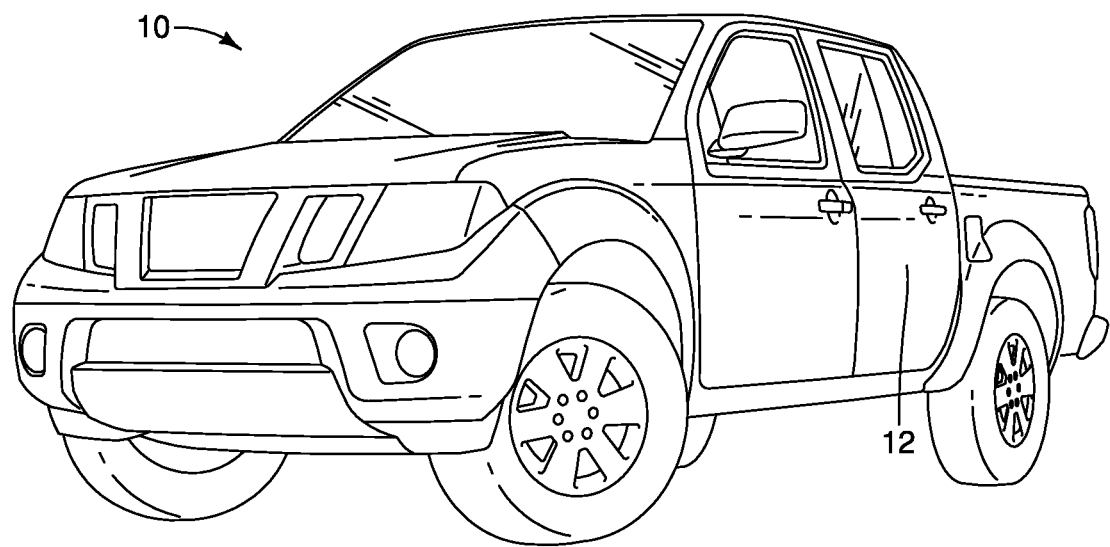
FIG. 1 is a perspective view of a vehicle that includes a rear door in accordance with a first embodiment.
Figure 2:
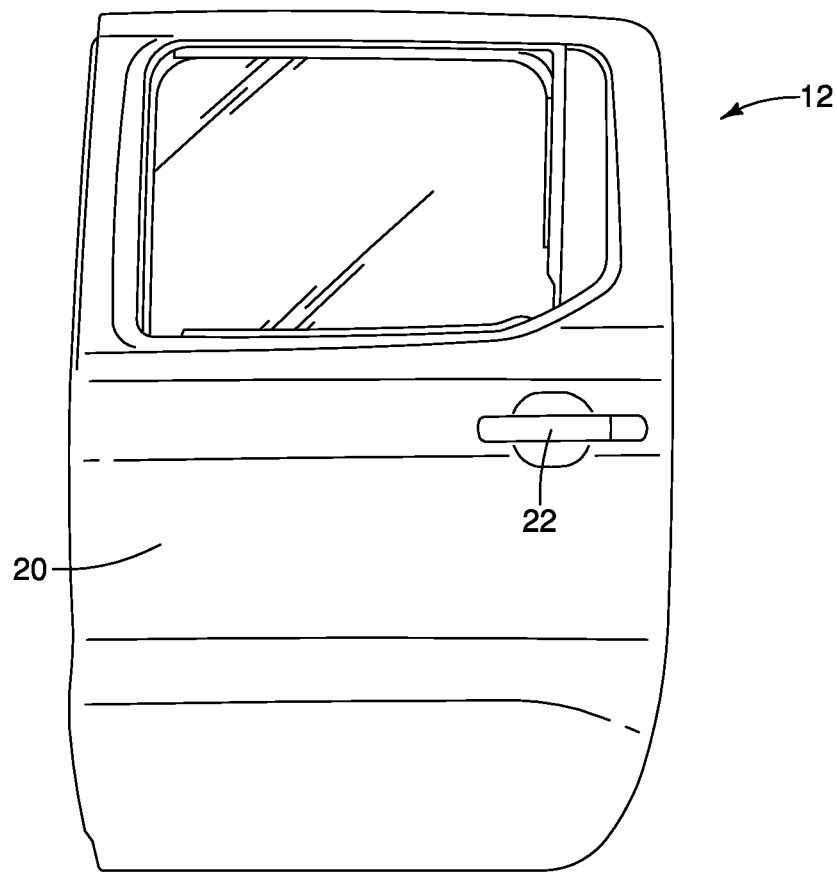
FIG. 2 is a side view of the rear door shown removed from the vehicle in accordance with the first embodiment.

Referring initially to FIGS. 1 and 2, a vehicle 10 is illustrated in accordance with a first embodiment. The vehicle 10 has a rear door 12 (FIGS. 1 and 2) that includes an impact pad 14 (shown in FIG. 3), as described in greater detail below.

Figure 3:
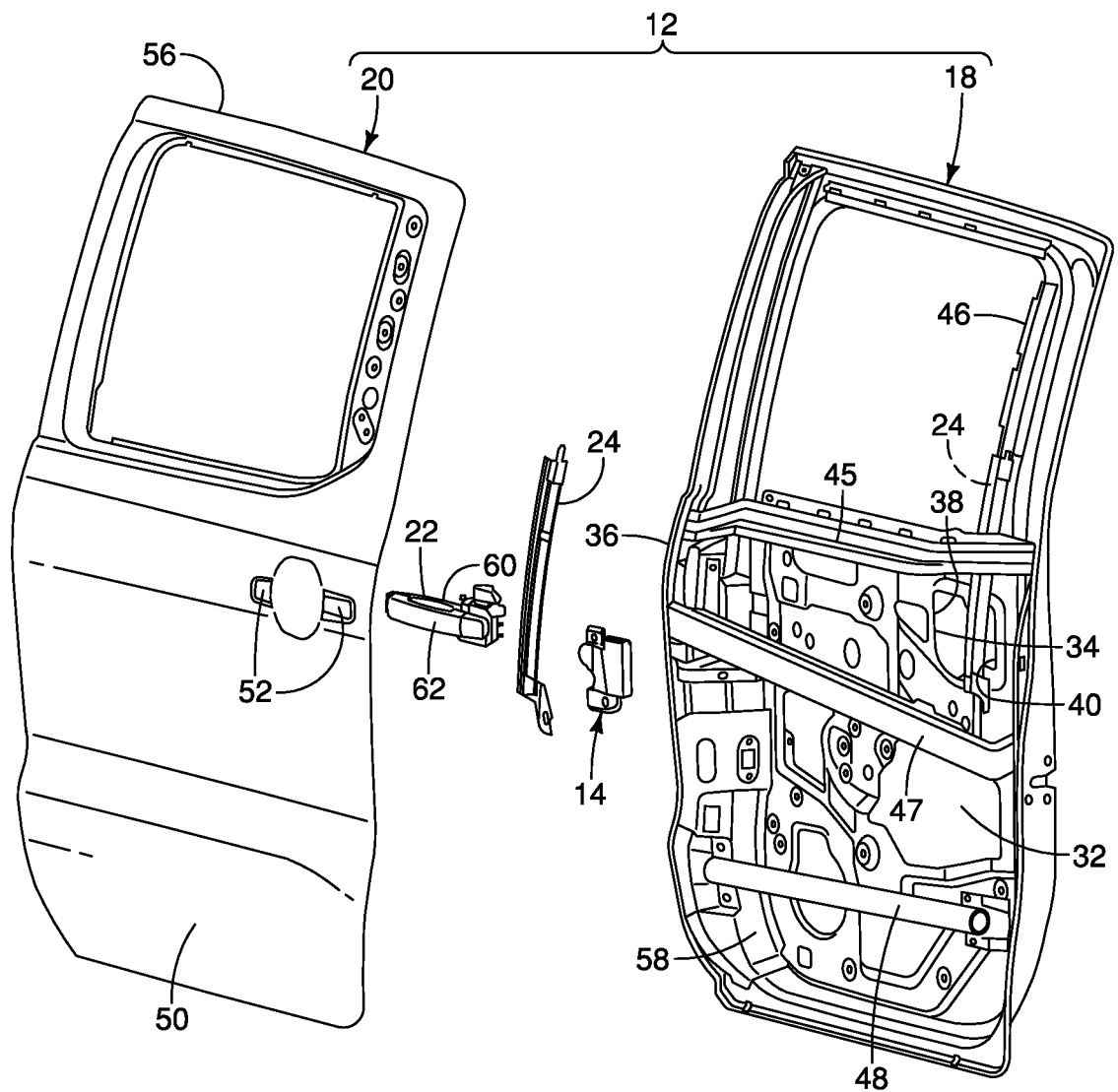
FIG. 3 is a perspective exploded view of the rear door showing an outer door panel, a door handle assembly, a window track, an impact pad and an inner door panel in accordance with the exemplary embodiment.

As shown in FIG. 3, the rear door 12 (a vehicle door structure) includes an inner door panel 18, an outer door panel 20, a door handle assembly 22, a window track 24 and the impact pad 14. It should be understood that the rear door 12 is a rear side door in that it is adjacent to a front side door along one side of the vehicle such that a passenger can enter the passenger compartment of the vehicle when the rear door 12 is open.

The rear door described in U.S. Ser. No. 17/539,147 filed Nov. 30, 2021 (U.S. Patent Application Publication No. 2023/0166586) is identical to the rear door 12 described herein, except the impact pad and the access opening described and shown in Ser. No. 17/539,147 have been replaced with the impact pad 14 and the access opening 34 shown herein and described below. U.S. Ser. No. 17/539,147 is incorporated herein by reference in its entirety.

A description of the inner door panel 18 is now provided with specific reference to FIGS. 3-7. The inner door panel 18 has an inboard surface 30 (FIGS. 4 and 6) and an outboard surface 32 (FIGS. 3, 5 and 7) with an access opening 34 that extends from the inboard surface 30 to the outboard surface 32. The inner door panel 18 has an outer periphery 36. The access opening 34 is defined by at least a forward edge 38, a rearward edge 40, and upper edge 42 and a lower edge 44.

The upper edge 42 includes a first mounting flange 42a that extends downward into the access opening 34. The lower edge 44 has a second mounting flange 44a that extends upward into the access opening 34.

The inner door panel 18 also includes an upper brace 45 that borders a lower edge of a window opening 46, a mid-reinforcement bracket 47 and a lower brace 48. The upper brace 45, the mid-reinforcement bracket 47 and the lower brace 48 all extend from a forward portion of the inner door panel 20 to a rearward portion of the inner door panel 20 and are welded in place in a conventional manner. As shown in FIG. 3, the door handle assembly 22 is located between the mid-reinforcement bracket 47 and the upper brace 45. Further, the impact pad 14 is also located between the mid-reinforcement bracket 47 and the upper brace 45 within the access opening 34.

The outer door panel 20 has an inboard surface (not shown) and an outboard surface 50. A pair of handle openings 52 extend from the inboard surface to the outboard surface 50. The outer door panel 20 also has an outer periphery 56 that is fixed to the corresponding outer periphery 36 of the inner door panel 18. A hollow area or cavity 58 is defined therebetween.

A window regulator (not shown) is installed within the cavity 58. The window regulator includes at least the one window track 24 that extends vertically between the door handle assembly 22 and a portion of the impact pad 14, as is described further below. Since window regulators are conventional mechanisms, further description of the window regulator is omitted for the sake of brevity.

The door handle assembly 22 has a base portion 60 and a lever portion 62. The base portion 60 overlays the inboard surface (not shown) of the outer door panel 20 within the cavity 58. The lever portion 62 extends along the outboard surface 50 of the outer door panel 20 and pivots relative to the base portion 62 in order to open the rear door 12 in a conventional manner.

As shown in FIGS. 4-7, the impact pad 14 is installed in the access opening 34 in a generally vertical orientation in which the impact pad 14 extends vertically from the first mounting flange 42a to the second mounting flange 44a, as described in greater detail below. It should be noted that the impact pad 14 is spaced apart from the forward edge 38 of the access opening 34.

Figure 11:
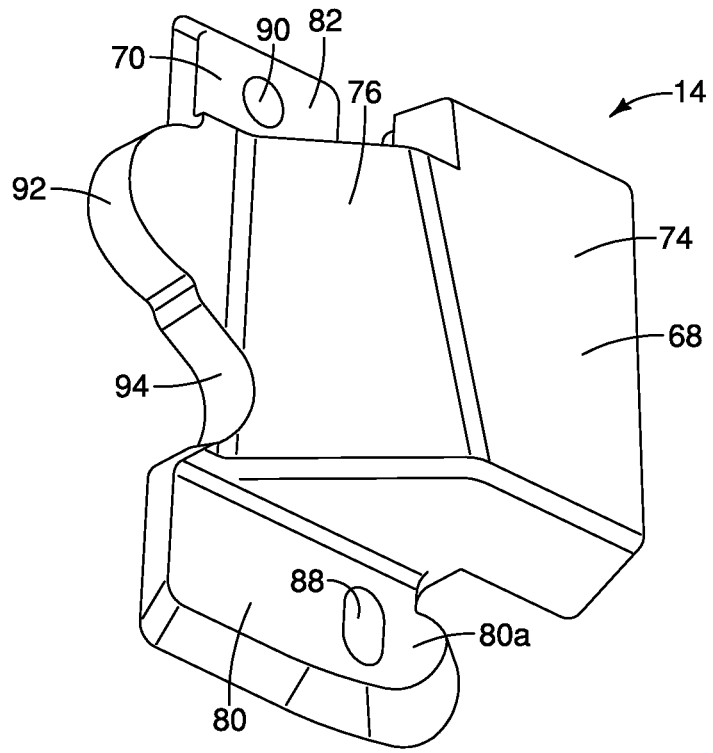
FIG. 11 is another perspective view of the impact pad removed from the rear door showing features of an outboard side of the main portion and the block portion in accordance with the first embodiment.
Figure 12:
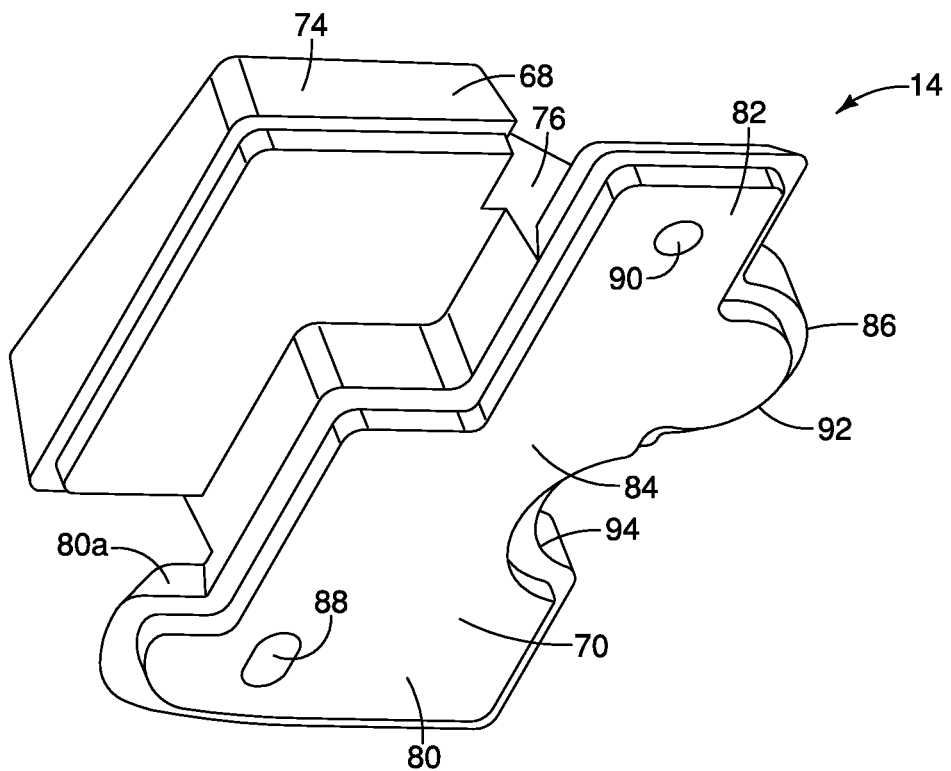
FIG. 12 is another perspective view of the impact pad removed from the rear door showing features of the inboard side of the main portion and the block portion in accordance with the first embodiment.
Figure 13:
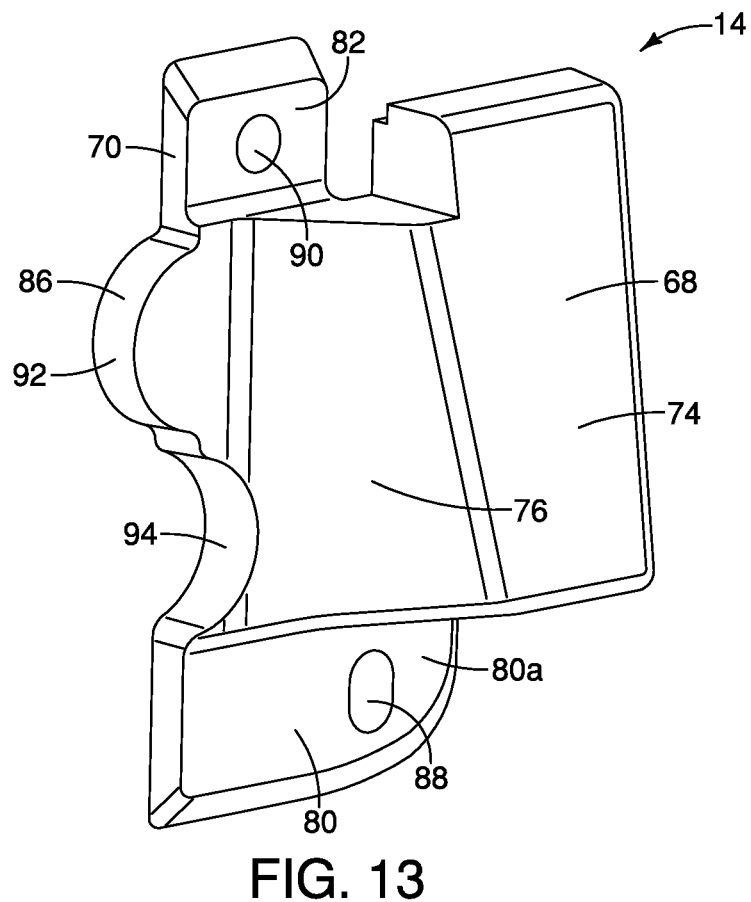
FIG. 13 is another perspective view of the impact pad removed from the rear door showing features of the outboard side of the main portion and the block portion in accordance with the first embodiment.

A description of the impact pad 14 is now provided with reference to FIGS. 8-20. As shown in FIGS. 8-15, the impact pad 14 has a block portion 68 and a main portion 70. As shown in FIGS. 11-13, the block portion 68 includes a first section 74 and a second section 76. The first section 74 has an irregular rectangular-like shape with the second section 76 extending from the first section 74 and having a tapered or inclined surface such that the thickness of the second section 76 decreases going from the first section toward the main portion 70.

The main portion 70 includes a lower attachment section 80, an upper attachment section 82 and a central section 84 that has a contoured forward edge 86. The lower attachment section 80 extends below the block portion 68 and has a fastener receiving opening 88. The lower attachment section 80 also includes a rearward extending flange section 80a, as shown in FIGS. 8-14 and 16. The upper attachment section 82 extends above the block portion 68 and has a fastener receiving opening 90. The contoured forward edge 86 of the central section 84 includes a convex curved part 92 and a concaved curved part 94.

Figure 4:
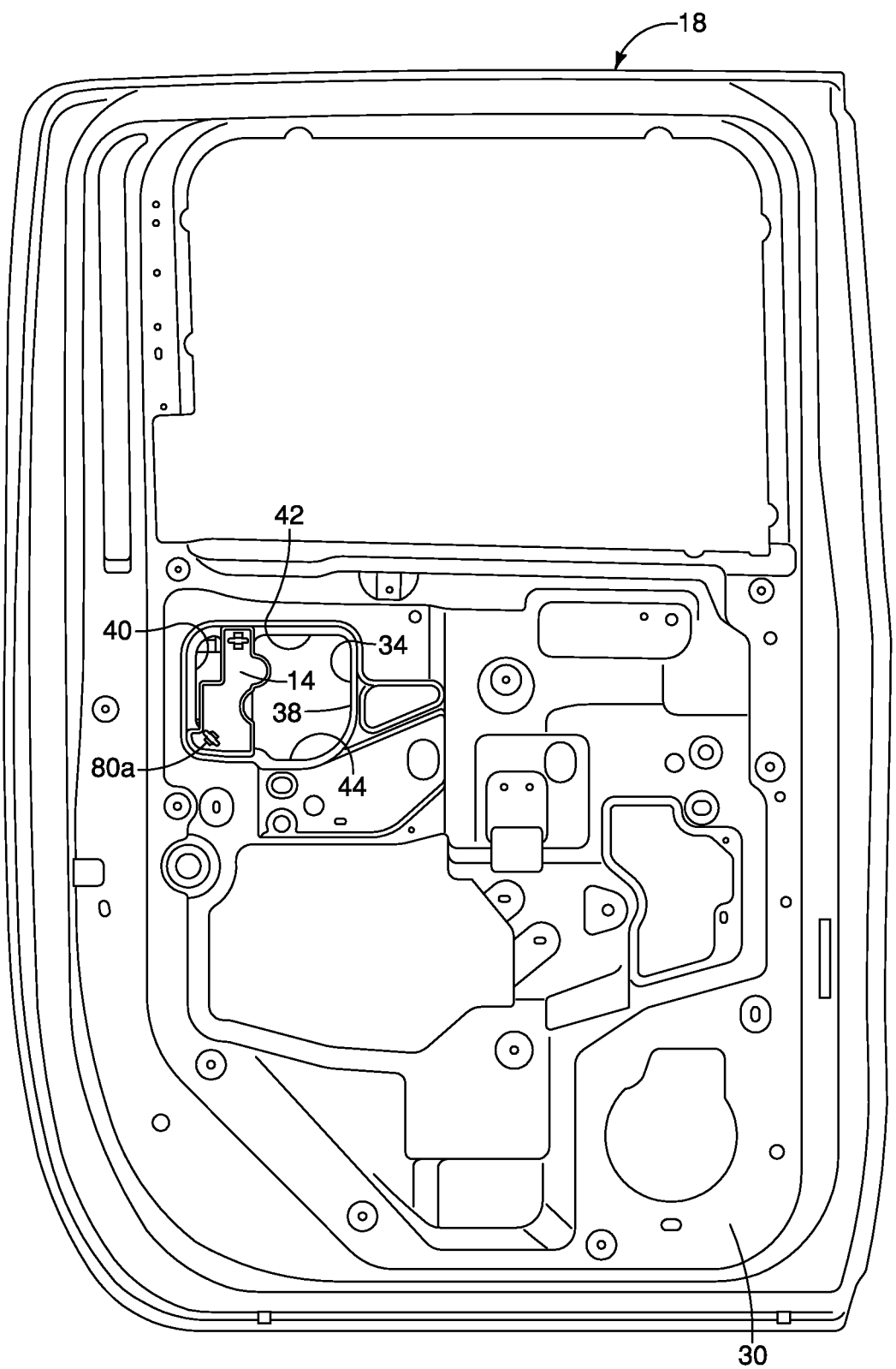
FIG. 4 is a side view of an inboard side of the inner door panel of the rear door showing the impact pad installed to an access opening of the inner door panel in accordance with the first embodiment.
Figure 5:
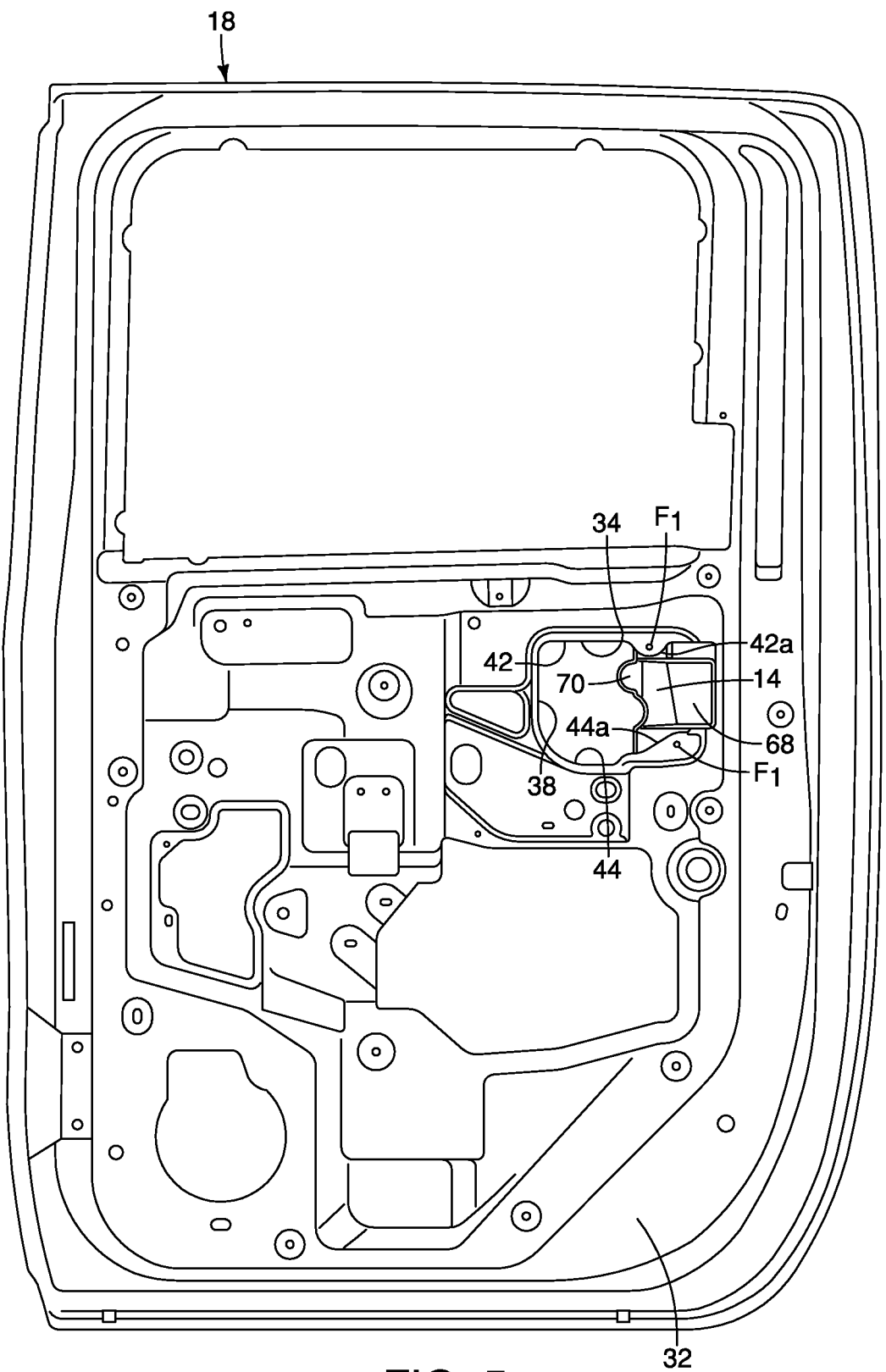
FIG. 5 is side view of an outboard side of the inner door panel of the rear door with the outer door panel and the window track removed showing the impact pad installed to the access opening of the inner door panel in accordance with the first embodiment.
Figure 6:
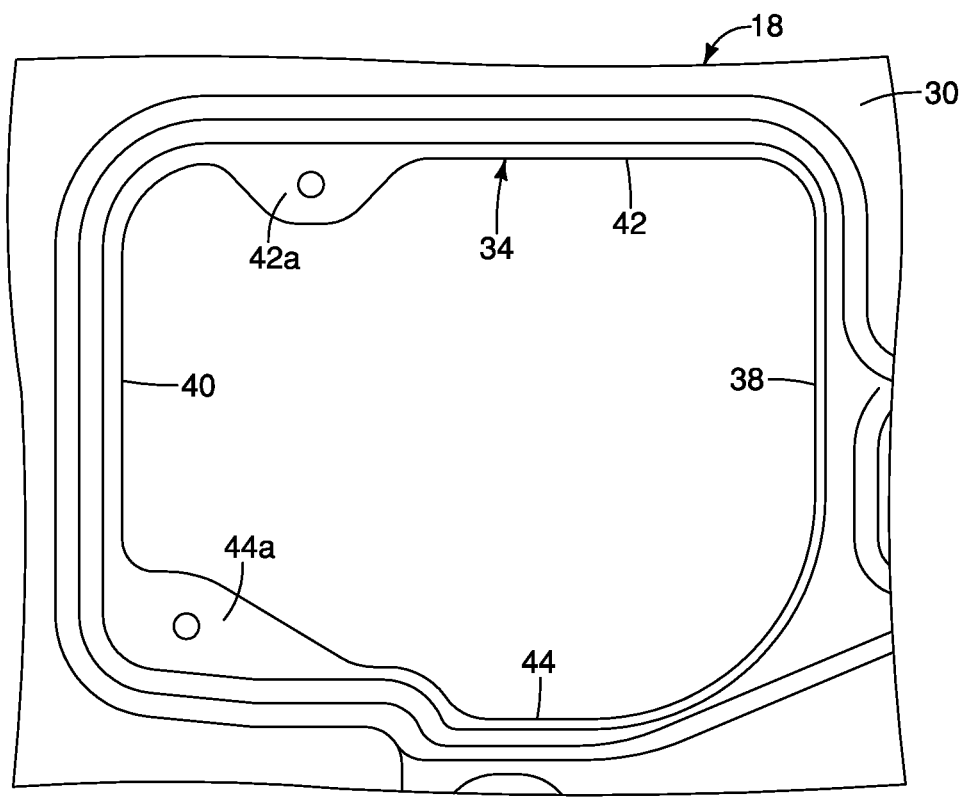
FIG. 6 is a side view of the inboard side of a portion of the inner door panel with the impact pad removed showing the access opening with first and second mounting flanges in accordance with the first embodiment.
Figure 7:
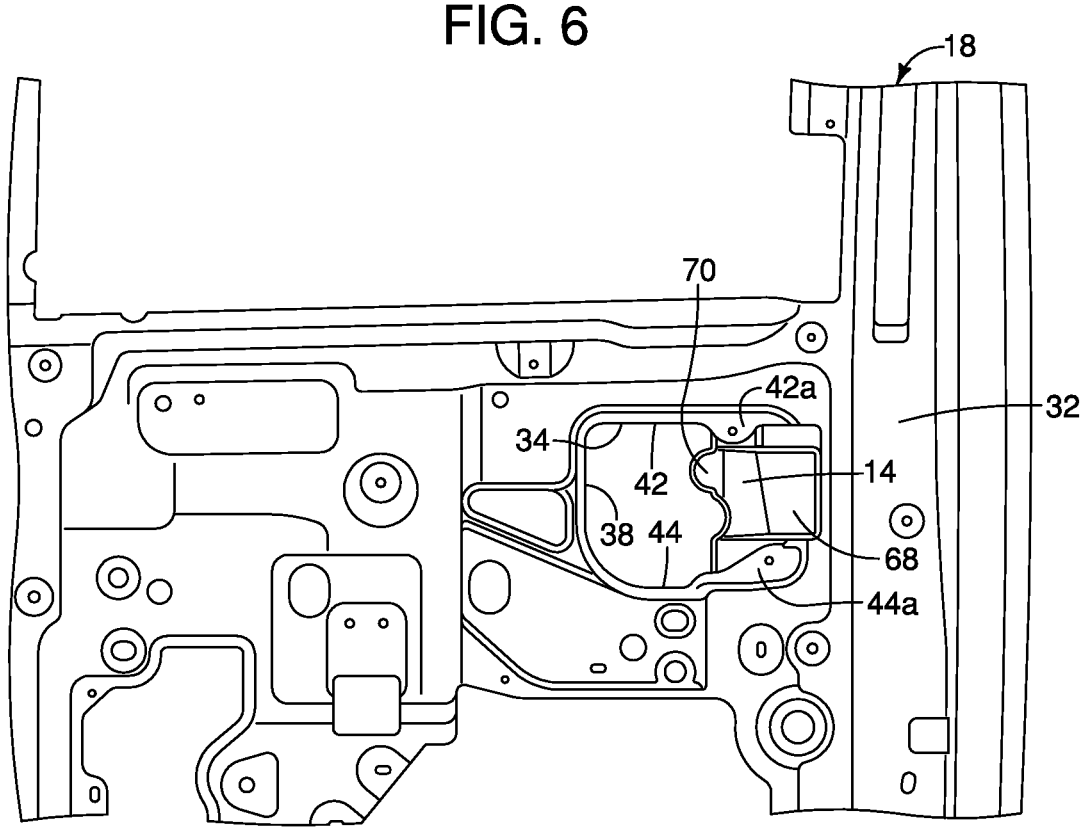
FIG. 7 is a side view of the outboard side of a portion of the inner door panel with the impact pad installed to the first and second mounting flanges of the access opening in accordance with the first embodiment.
Figure 8:
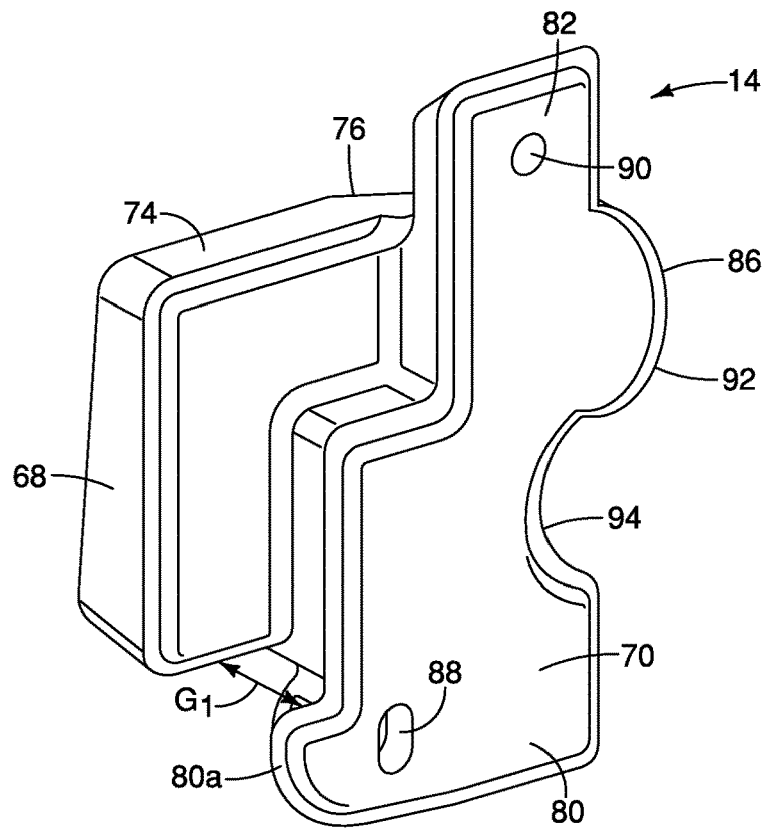
FIG. 8 is a perspective view of the impact pad removed from the rear door showing an inboard side of a block portion and a main portion, the main portion having a lower attachment section and an upper attachment section that attach to the first and second mounting flanges of the access opening in accordance with the first embodiment.
Figure 9:
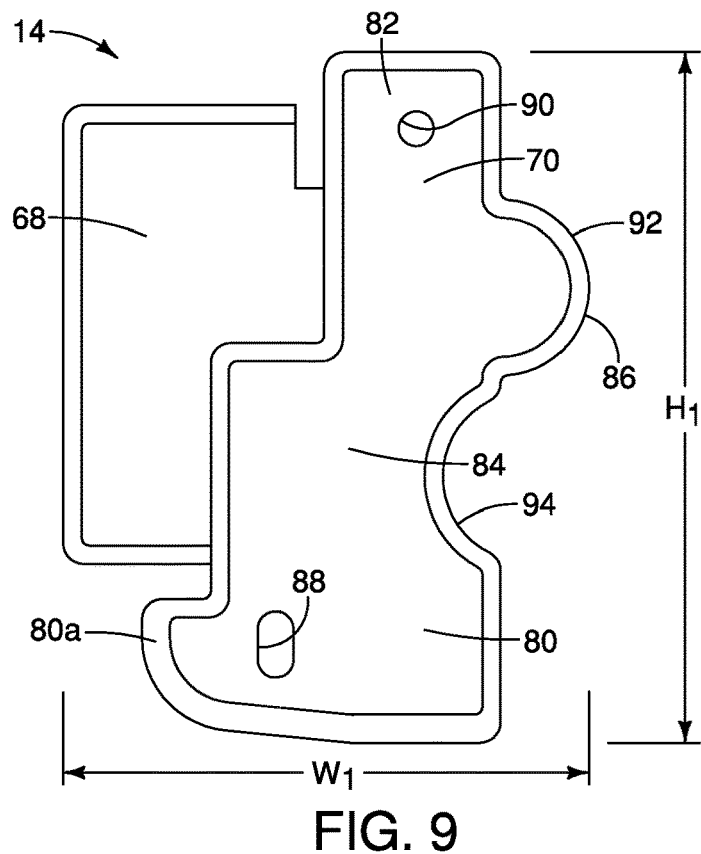
FIG. 9 is an inboard side view of the impact pad removed from the rear door showing the lower attachment section and the upper attachment section of the main portion in accordance with the first embodiment.
Figure 10:
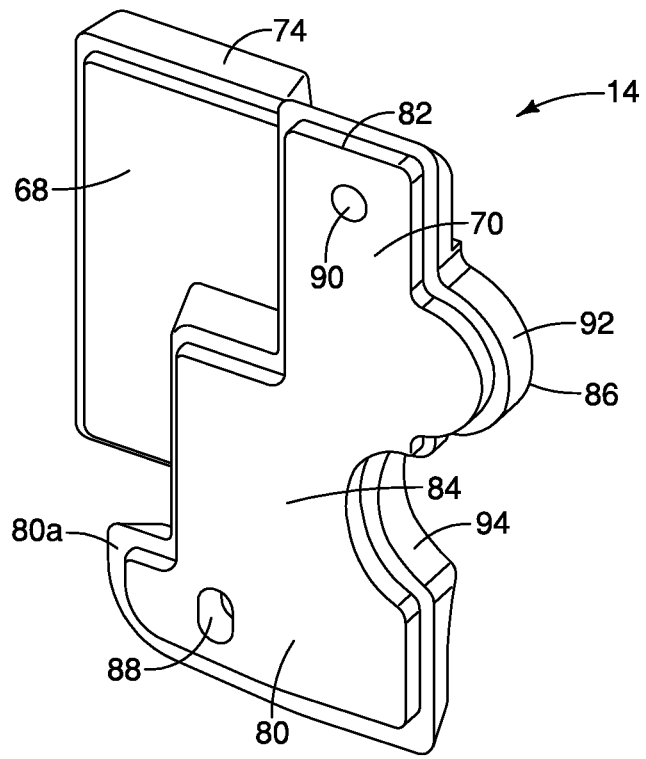
FIG. 10 is another perspective view of the impact pad viewed from beneath the impact pad looking upward showing further features of the inboard side of the main portion and the block portion in accordance with the first embodiment.
Figure 14:
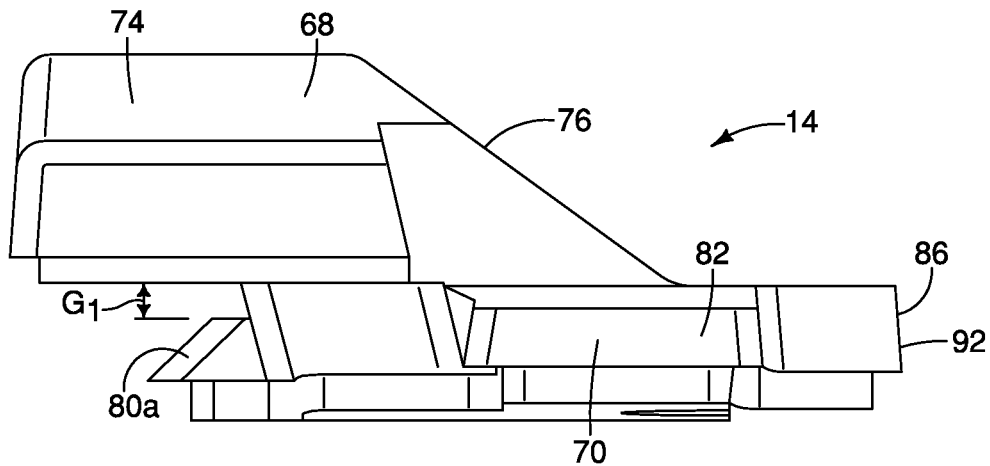
FIG. 14 is top view of the impact pad removed from the rear door showing features of the inboard side of the main portion and the block portion in accordance with the first embodiment.
Figure 15:
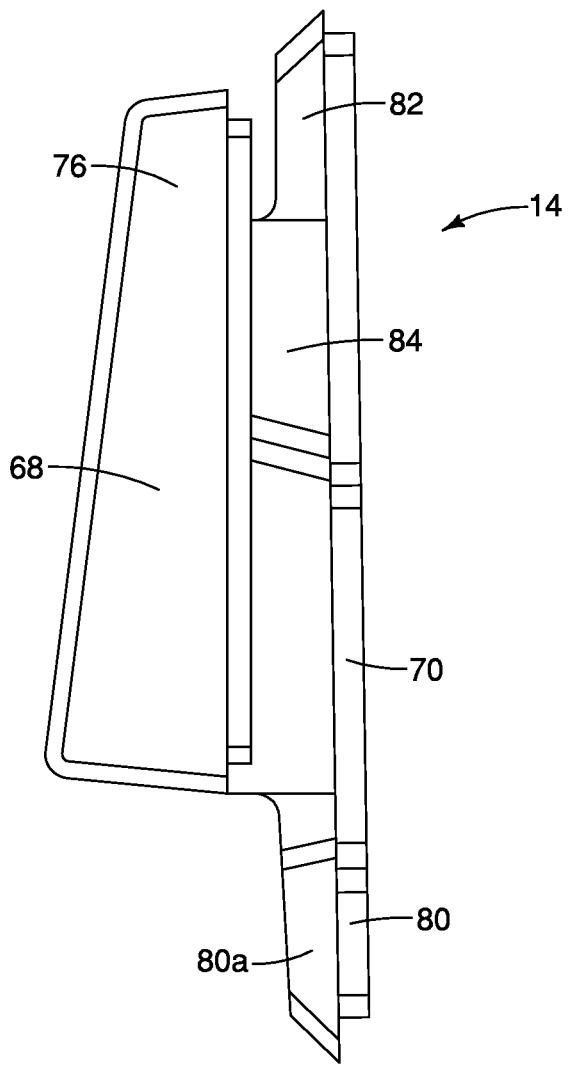
FIG. 15 is rear view of the impact pad removed from the rear door showing features of the inboard side of the main portion and the block portion in accordance with the first embodiment.
Figure 16:
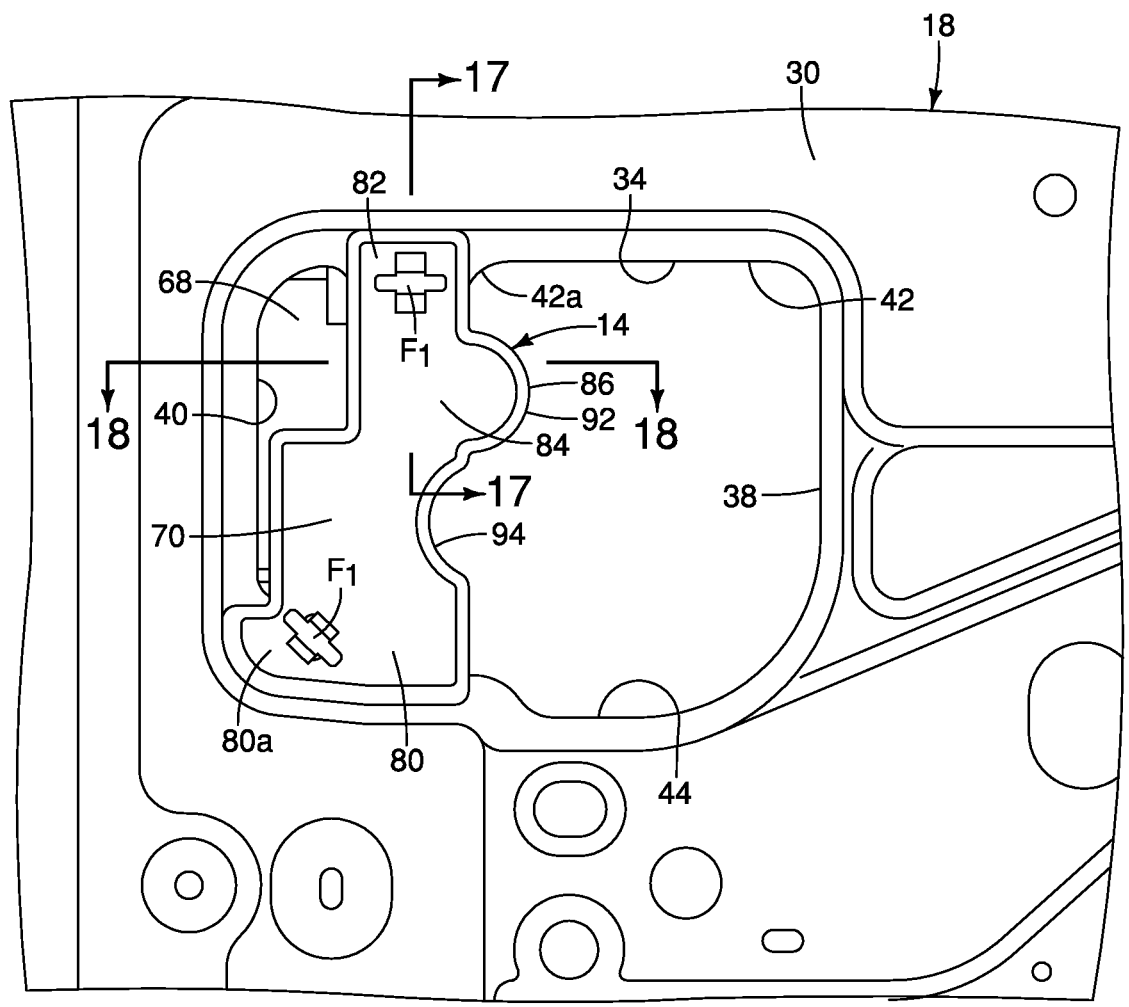
FIG. 16 is side view of a portion of the inboard side of the rear door showing the impact pad installed in the access opening of the rear door with the block portion of the impact pad being located along the outboard side of the rear door and the main portion of the impact pad being located along the inboard side of the rear door in accordance with the first embodiment.
Figure 17:
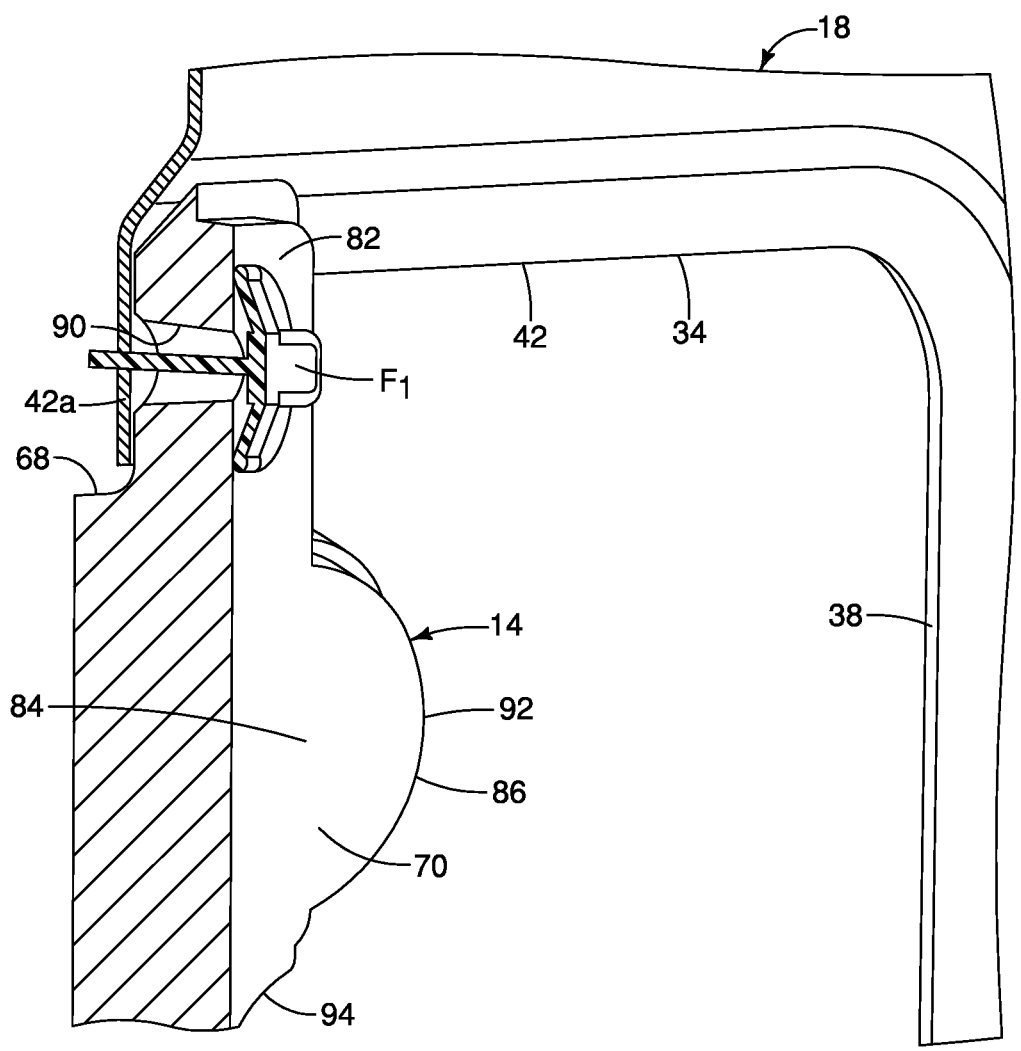
FIG. 17 is cross-sectional view of a portion of the rear door and the impact pad taken along the line 17-17 in FIG. 16 in accordance with the first embodiment.
Figure 18:
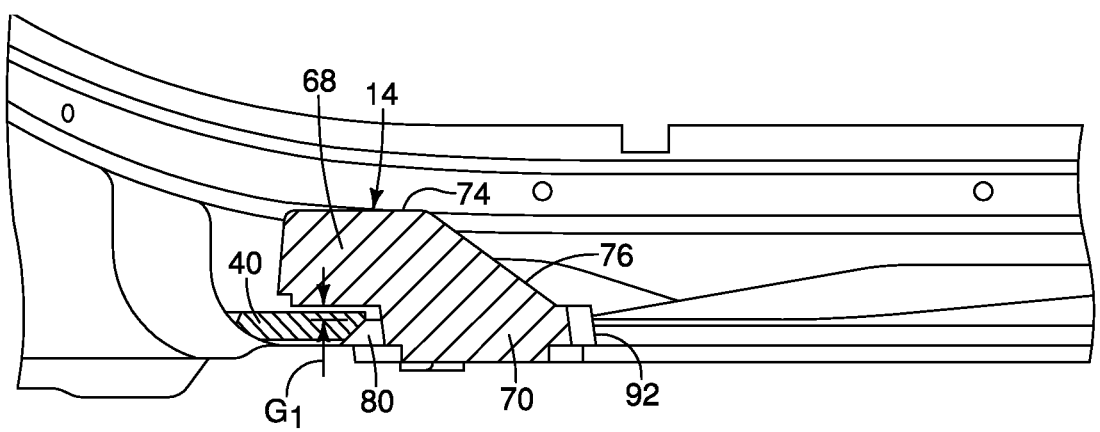
FIG. 18 is cross-sectional view of a portion of the rear door and the impact pad taken along the line 18-18 in FIG. 16 in accordance with the first embodiment.
Figure 19:
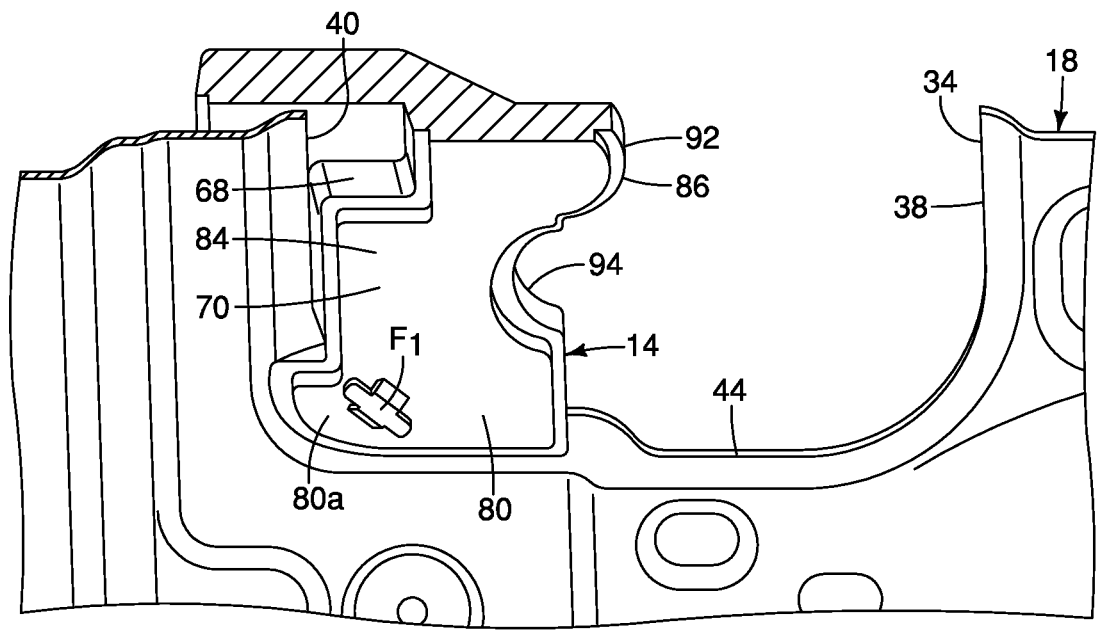
FIG. 19 is cross-sectional perspective view of the portion of the rear door and the impact pad also taken along the line 18-18 in FIG. 16 in accordance with the first embodiment.
Figure 20:
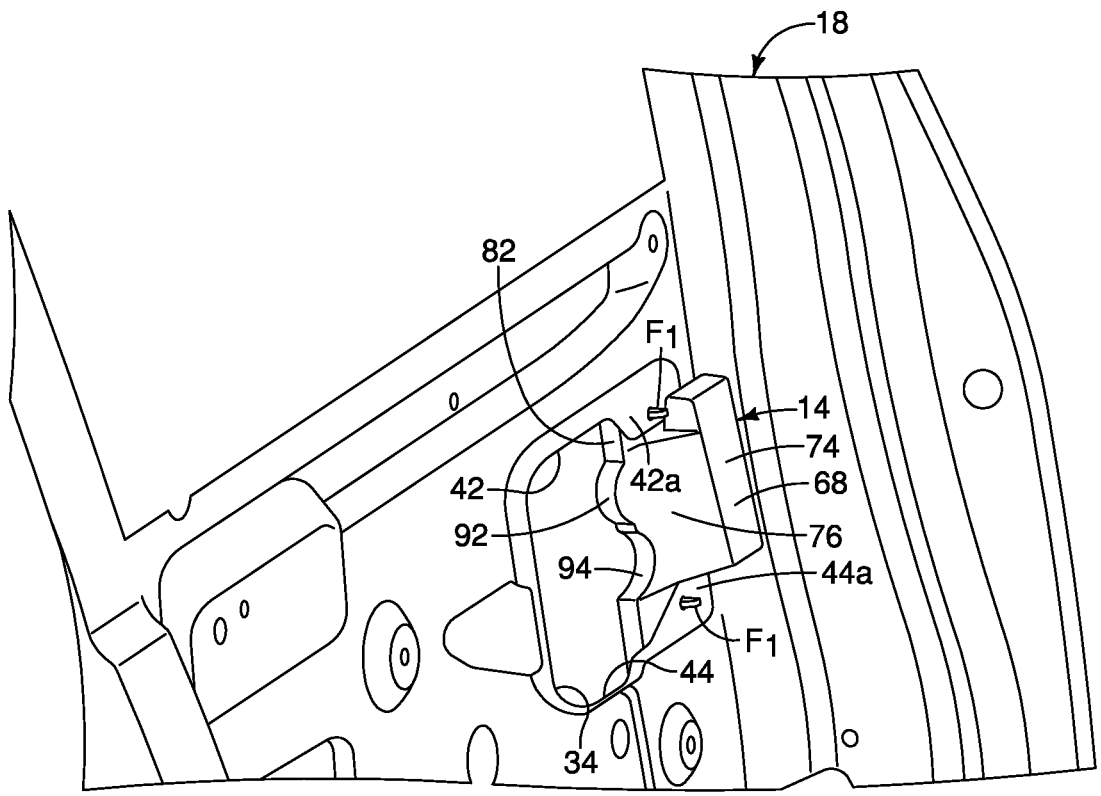
FIG. 20 is a perspective view of a portion of the outboard side of the inner door panel showing the impact pad installed to the rear door within the access opening in accordance with the first embodiment.

As shown in FIG. 14, the flange section 80a and the first section 74 of the block portion 68 define a gap $G_1$. With the impact pad 14 installed in the access opening 34, the flange section 80a extends the inboard surface 30 of the inner door panel 18 adjacent to the rearward edge 40, as shown in FIG. 4. At the same time, with the impact pad 14 installed, the block portion 68 extends the outboard surface 32 of the inner door panel 18 adjacent to the rearward edge 40, as shown in FIGS. 5 and 7.

It should be understood that the first section 74 of the block portion 68 is positioned vertically above the flange section 80a with the impact pad 14 installed in the access opening 34. In other words, the flange section 80a is located below the block portion 68 the impact pad 14 installed in the access opening 34. The vertical relationship between the block portion 68 and the flange section 80a is shown in FIGS. 8, 11, 13 and 15. Therefore, the gap $G_1$ is only visible in FIG. 14.

Once the impact pad 14 is installed within the access opening 34, snap-fitting fasteners $F_1$ are inserted into the openings 88 and 90, respectfully, as shown in FIGS. 4, 5, 17 and 19-20.

With the impact pad 14 installed to the inner door panel 18, a portion of the block portion 68 of the impact pad 14 overlays and contacts a portion of the outboard surface 32 of the inner door panel 18 adjacent to the access opening 34. Once the impact pad 14 is installed, the block portion 68 is preferably in alignment with a portion of the base portion 60 of the door handle assembly 22.

With the impact pad 14 installed to the inner door panel 18, a portion of the main portion 30 of the impact pad 14 is located along the inboard surface 30 of the inner door panel 18.

The impact pad 14 is preferably formed as a single, unitary, monolithic and generally homogeneous member. The impact pad 14 can be made of any of a variety of materials that absorb impact energy, such as resin materials, polymers, rubber or rubber-like materials, . . . etc. Further, the impact pad 14 is made of a material that is compressible but resilient in order to absorb a maximum amount of impact energy.

As is shown in FIG. 3, the window track 24 extends vertically between the base portion 60 of the door handle assembly 22 and the block portion 68 of the impact pad 14. Due to these relationships, the base portion 60 of the door handle assembly 22, the spacer material 94, the window track 24 and the block portion 68 of the impact pad 14 define an impact receiving path. An impact receiving path is such that in response to an impact event where impact force impacts the outer door panel 20 proximate the door handle assembly 22, the impact force is transmitted from the outer door panel 20 to the base portion 60, then to and through the window track 24, to the block portion 68 of the impact pad 14 and finally to the inner door panel 18.

One advantage to the arrangement of the door handle assembly 22, the window track 24 and the impact pad 14 is that the impact force more directly impacts a rearward area of the rear door 12 in its entirety. Consequently, the impact force has less of an impact on the door handle assembly 22 itself. In the absence of the impact pad 14, the outer door panel, the inner door panel and the door handle assembly 22 is more likely to be deformed by an impact.

Second Embodiment

Figure 21:
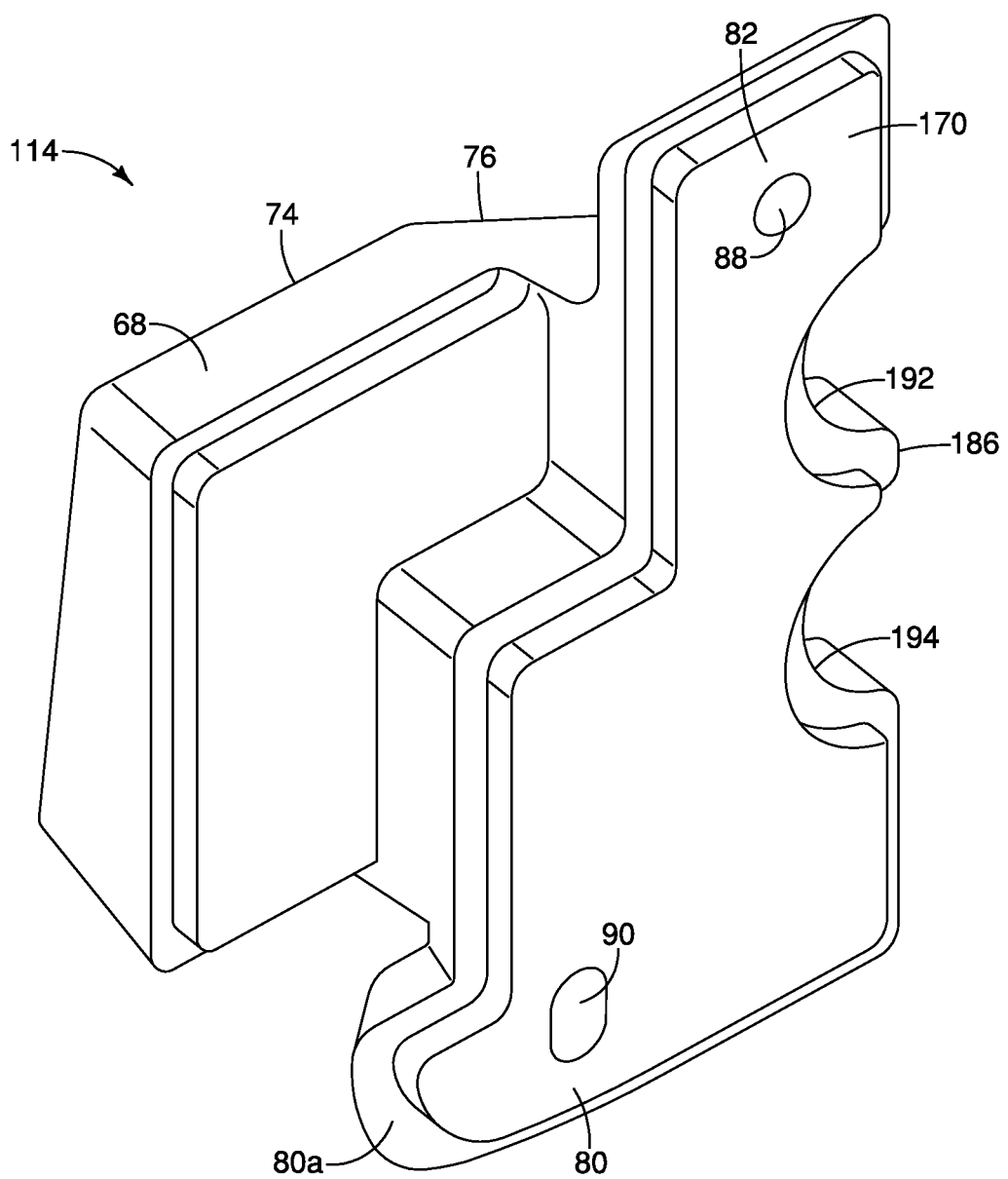
FIG. 21 is a perspective view of an impact pad removed from the rear door showing an inboard side of a block portion and a main portion, the main portion having a lower attachment section and an upper attachment section that attach to the first and second mounting flanges of the access opening of the rear door in accordance with a second embodiment.
Figure 22:
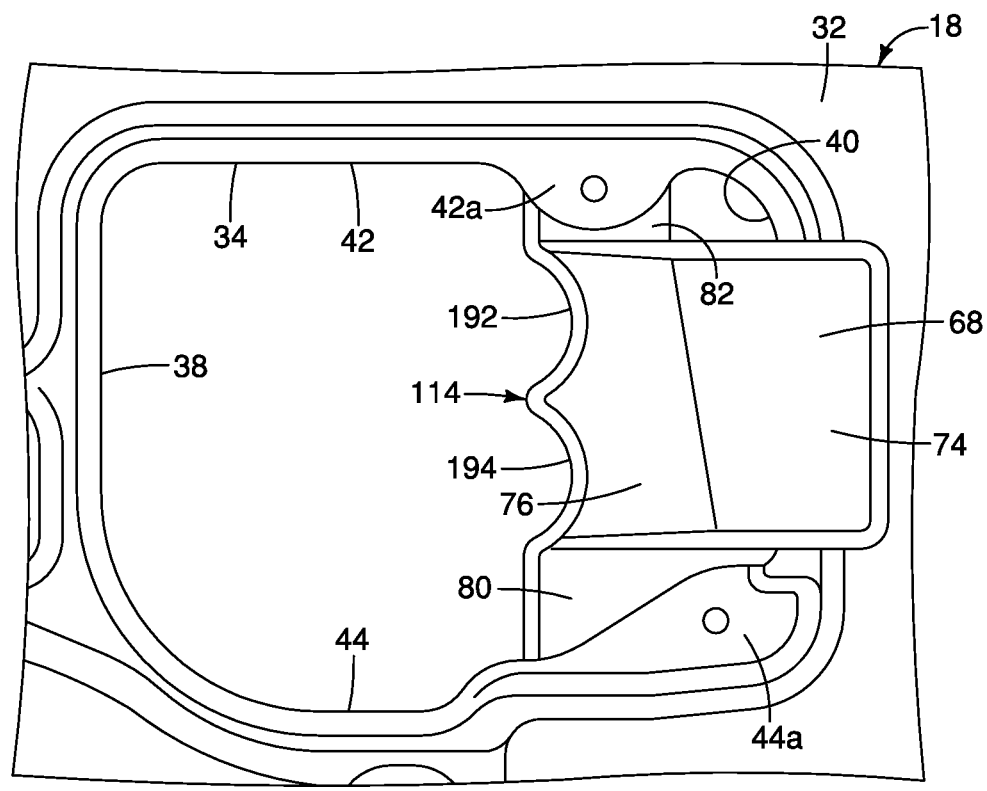
FIG. 22 is a side view of a portion of the outboard side of the rear door showing the impact pad installed to the rear door at the access opening in accordance with the second embodiment.
Figure 23:
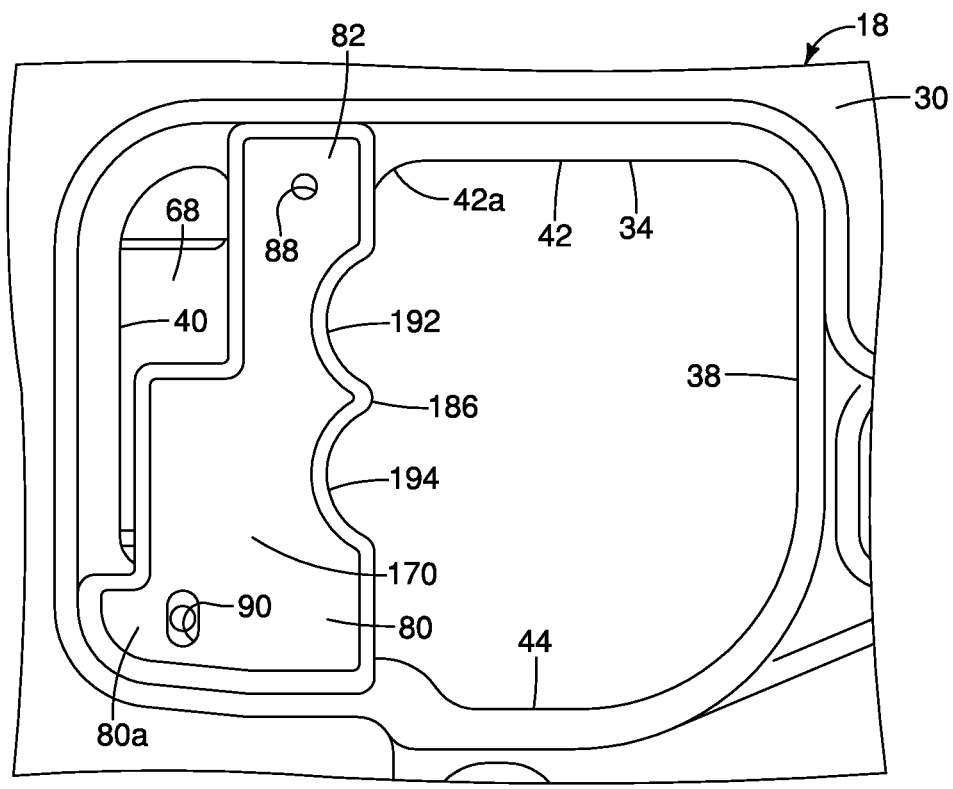
FIG. 23 is a side view of the portion of the inboard side of the rear door depicted in FIG. 22 showing the impact pad installed to the rear door at the access opening in accordance with the second embodiment.

Referring now to FIG. 21-23, an impact pad 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The impact pad 114 includes many of the shapes and features of the impact pad 14 of the first embodiment. Specifically, the impact pad 114 includes the block portion 68 with its first section 74 and the second section 76, as described in the first embodiment.

The impact pad 114 includes a main portion 170 that has been modified as compared to the main portion 170 of the first embodiment. The main portion 170 includes the lower attachment section 80, the fastener receiving opening 88, the rearward extending flange section 80a, the upper attachment section 82 and its fastener receiving opening 90, as described in the first embodiment. However, the contoured forward edge 86 of the first embodiment is replaced with a contoured forward edge 186 that includes a first concaved area 192 and a second concaved area 194.

The various vehicle structures and elements, other than the above-described features of the rear door 12, are conventional components that are well known in the art. Since such vehicle structures and elements are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door structure, comprising:
    an inner door panel having an inboard surface and an outboard surface with an access opening that extends from the inboard surface to the outboard surface, the access opening being defined by an upper edge, a lower edge, a forward edge and a rearward edge; and
    an impact pad having a main portion and a block portion, the main portion having a lower attachment section and an upper attachment section that are both located along the inboard side of the upper and lower edges that define the access opening, the lower attachment section being attached to the lower edge and the upper attachment section being attached to the upper edge, with a section of the block portion being located along the outboard side of the inner door panel, with the impact pad being spaced apart from the forward edge of the access opening, the upper attachment section of the main portion of the impact pad being attached to a first flange of the inner door panel, the first flange extending downwardly into the access opening, and the main portion and the block portion define a gap therebetween with the rearward edge that defines the access opening being confined within the gap.

2. The vehicle door structure according to claim 1, wherein
    a section of the block portion extends through the access opening.

3. The vehicle door structure according to claim 1, wherein
    the main portion of the impact pad is vertically oriented when installed to the inner door panel.

4. The vehicle door structure according to claim 1, wherein
    the lower attachment section of the main portion of the impact pad is attached to a second flange of the inner door panel, the second flange extending upwardly into the access opening toward the first flange.

5. The vehicle door structure according to claim 1, further comprising
    an outer door panel having an outer periphery, and
    the inner door panel further having an outer periphery, the respective outer peripheries of the inner door panel and the outer door panel being fixed to one another with a cavity being defined therebetween, the access opening providing access to the cavity.

6. A vehicle door structure, comprising:
    an inner door panel having an inboard surface and an outboard surface with an access opening that extends from the inboard surface to the outboard surface, the inner door panel having an outer periphery;
    an outer door panel having an inboard surface and an outboard surface with a handle opening that extends from the inboard surface to the outboard surface, the outer door panel being fixed to a corresponding outer periphery of the inner door panel defining a cavity therebetween;
    a door handle assembly having a base portion overlaying the inboard surface of the outer door panel within the cavity and a lever portion extending along the outboard surface of the outer door panel; and
    an impact pad having a main portion and a block portion, with the block portion of the impact pad overlaying a portion of the outboard surface of the inner door panel rearward of the access opening, an upper section of the main portion of the impact pad overlaying a first portion of the inboard surface of the inner door panel adjacent to and above the access opening and a lower portion of the impact pad overlaying a second portion of the inboard surface of the inner door panel adjacent to and below the access opening such that the impact pad is spaced apart from a forward portion of the access opening, the main portion and the block portion of the impact pad define a gap therebetween with the rearward edge that defines the access opening being confined within the gap.

7. The vehicle door structure according to claim 6, wherein
    a section of the block portion extends through the access opening.

8. The vehicle door structure according to claim 6, wherein
    the main portion of the impact pad is vertically oriented when installed to the inner door panel.

9. The vehicle door structure according to claim 6, wherein
    the upper section of the main portion of the impact pad is attached to a first flange of the inner door panel, the first flange extending downwardly into the access opening.

10. The vehicle door structure according to claim 9, wherein
    a lower attachment section of the main portion of the impact pad is attached to a second flange of the inner door panel, the second flange extending upwardly into the access opening toward the first flange.

11. The vehicle door structure according to claim 6, further comprising
    an outer door panel having an outer periphery, and
    the inner door panel further having an outer periphery, the respective outer peripheries of the inner door panel and the outer door panel being fixed to one another with a cavity being defined therebetween, the access opening providing access to the cavity.

* * * * *